(12) United States Patent
Hauptmann

(10) Patent No.: US 9,255,612 B2
(45) Date of Patent: Feb. 9, 2016

(54) OVERTORQUE RELEASE DRIVE

(71) Applicant: LO-REZ VIBRATION CONTROL LTD., Vancouver (CA)

(72) Inventor: Edward G. Hauptmann, West Vancouver (CA)

(73) Assignee: LO-REZ VIBRATION CONTROL LTD., Vancouver (CA)

( * ) Notice: Subject to any disclaimer, the term of this patent is extended or adjusted under 35 U.S.C. 154(b) by 0 days.

(21) Appl. No.: 14/381,563

(22) PCT Filed: Feb. 25, 2013

(86) PCT No.: PCT/CA2013/050140
§ 371 (c)(1),
(2) Date: Aug. 27, 2014

(87) PCT Pub. No.: WO2013/127007
PCT Pub. Date: Sep. 6, 2013

(65) Prior Publication Data
US 2015/0096862 A1    Apr. 9, 2015

Related U.S. Application Data

(60) Provisional application No. 61/634,369, filed on Feb. 27, 2012.

(51) Int. Cl.
*F16D 7/08*     (2006.01)
*F16D 25/061*   (2006.01)
*F16D 7/02*     (2006.01)

(52) U.S. Cl.
CPC  *F16D 7/028* (2013.01); *F16D 7/08* (2013.01); *F16D 25/061* (2013.01)

(58) Field of Classification Search
CPC .......... F16D 7/028; F16D 7/08; F16D 25/061
See application file for complete search history.

(56) References Cited

U.S. PATENT DOCUMENTS

| 4,231,443 | A |   | 11/1980 | van der Lely |
| 4,240,514 | A |   | 12/1980 | van der Lely |
| 4,467,663 | A |   | 8/1984  | van der Lely |
| 4,798,559 | A |   | 1/1989  | Maurer et al. |
| 4,884,670 | A |   | 12/1989 | McCormick et al. |
| 4,934,500 | A |   | 6/1990  | Hanks et al. |
| 5,314,381 | A | * | 5/1994  | Maurer ................. F16D 43/206 192/56.2 |
| 5,601,169 | A |   | 2/1997  | Wodecki |
| 6,059,087 | A |   | 5/2000  | Parry |
| 7,237,663 | B2 |  | 7/2007  | Whitney |
| 2011/0240313 | A1 | | 10/2011 | Knobloch, Jr. et al. |

FOREIGN PATENT DOCUMENTS

| DE | 933614  | C  | 9/1955  |
| EP | 0386729 | A1 | 3/1990  |
| EP | 1260753 | A2 | 11/2002 |
| FR | 2303205 | A1 | 10/1976 |

(Continued)

*Primary Examiner* — Jacob S Scott
(74) *Attorney, Agent, or Firm* — Oyen Wiggs Green & Mutala LLP

(57) ABSTRACT

A torque-release coupling can be remotely reset after an over-torque condition. A threshold torque may be adjusted while the coupling is running. A pressure of pressurized fluid adjusts a force required to release a detent mechanism that holds a torque transmitting member in engagement across an interface between moving parts.

27 Claims, 8 Drawing Sheets

(56) References Cited

FOREIGN PATENT DOCUMENTS

| GB | 544230 | A | 4/1942 |
| GB | 0933614 | A1 | 8/1963 |
| GB | 1293602 | A | 10/1972 |
| WO | WO2011063796 | A1 | 6/2011 |
| WO | WO2012097847 | A1 | 7/2012 |

* cited by examiner

OVERTORQUE RELEASE DRIVE

RELATED APPLICATIONS

This application claims priority from U.S. Application No. 61/634,369 filed 27 Feb. 2012. For purposes of the United States, this application claims the benefit under 35 U.S.C. §119 of U.S. Application No. 61/634,369 filed 27 Feb. 2012 and entitled TORQUE LIMITING DEVICE WITH NOVEL FEATURES FOR CONTROL AND OPERATION which is hereby incorporated herein by reference for all purposes.

TECHNICAL FIELD

This invention relates to mechanisms for transmitting forces between moving parts of machines. Embodiments provide torque-limiting or force-limiting couplings.

BACKGROUND

Machine components can become overloaded, for example, though failure of other components or as a result of the work that the machine is being called upon to do. It is desirable to provide a mechanism that can prevent damage due to such overloads.

Torque limiters are mechanical devices installed in a power driveline, for example between a driver such as motor or engine, and a driven part such as a pump, cutting head, rock crusher, or the like. Torque limiters can be particularly important in large high-power machinery in which failure of components can have very expensive consequences. Machinery for processing rocks such as rock crushers, tunnel boring machines, mining machines and the like are non-limiting examples of such heavy machinery. These machines are particularly vulnerable because the quantity and quality of feedstock that they are called upon to process may vary widely—causing the loads experienced by components of the machine to be somewhat unpredictable.

Torque limiters either slip at a pre-determined torque level or else allow the driving and driven parts to be temporarily separated at a pre-determined torque level, thereby preventing overload and failure of parts of the driveline.

There are several types of torque limiter in common use: shear pin, synchronous magnetic, ball detent, pawl and spring, and various styles of friction plate and clutch mechanisms, each type having advantages or disadvantages depending on the intended use.

One of the simplest torque limiting mechanisms is a shear pin. A shear pin is designed to be strong enough to transmit torque up to a design level and to fail at higher torques. The shear pin may be designed to fail at a level such that the delivered torque will not be enough to damage machine components downstream from the shear pin. While shear pins can be effective, simple to implement and relatively inexpensive, a disadvantage of the use of shear pins is that it can be time consuming to replace a failed shear pin. This is especially true where the shear pin is located in a part of the machine that is difficult to access. In large equipment the cost of downtime may be very large.

Various torque release couplings and torque-limiting clutches are described in the literature. For example, some of these are described in the following patent publications:
US 2011/0240313;
EP 1260753;
FR 2303205;
GB 933614;
GB 1293602;
U.S. Pat. No. 4,231,443;
U.S. Pat. No. 4,240,514;
U.S. Pat. No. 4,467,663;
U.S. Pat. No. 4,798,559;
U.S. Pat. No. 5,601,169; and,
U.S. Pat. No. 7,237,663.

One type of torque limiting coupling is available from Lo-Rez Vibration Control Ltd. of Vancouver, Canada. In these couplings, driven and driver flanges are normally connected by an arrangement of safety elements which include balls that engage pockets. The safety elements employ a ball-detent arrangement. The driving balls are released from the pockets by a second set of balls specially arranged to "unlock" the main ball at a prescribed spring load, or equivalently, applied torque between the driver and driven parts. These couplings, while effective, are not designed to be remotely reset after an overload condition has occurred. This type of coupling can be reset by rotating the parts of the coupling into alignment and then tapping or hammering on the ends of rods that move when the coupling is released.

All of the couplings described above have various disadvantages for certain applications. For example, some of the couplings do not disengage input from output when an over-torque condition occurs but merely limit the torque delivered to the output. Some of the couplings cannot be remotely reset when an over-torque condition occurs. Some of the couplings provide no convenient way to adjust the maximum amount of torque that can be delivered.

Despite the variety of torque-limiting clutches and other mechanisms that are described in the literature, there remains a need for practical and cost-effective over-torque protection mechanisms. There is a particular need for such mechanisms that can be reset remotely after an over-torque condition has occurred. There is also a need for such systems which permit the maximum torque that the mechanisms can deliver before an over-torque condition is triggered to be adjusted.

SUMMARY

This invention has a number of aspects. One aspect provides force-limiting couplings for transmitting forces between movable parts. In some embodiments the movable parts are mounted for rotation and the force-limiting couplings comprise torque-limiting couplings. Another aspect provides methods for limiting forces (including torques) between movable parts. Some embodiments provide mechanisms by which a threshold force at which a coupling releases is set by a pressurized fluid (which may be a liquid or gas). Some embodiments provide mechanisms for resetting a coupling after it has released by means of a pressurized fluid actuator.

One non-limiting example aspect provides a force-limiting coupling comprising a force transmitting member slidably disposed in a channel on a first movable part. In some embodiments the force-transmitting member comprises a ball. In some embodiments the channel comprises a bore dimensioned to receive the ball. The coupling comprises a second movable part. The second movable part comprises a seat for receiving a bearing surface of the force-transmitting member. In some embodiments the seat is replaceable. For example, the seat may be bolted to the second part. The seat comprises a bearing surface inclined in a force-transmission direction In some embodiments the seat comprises a circular member having a beveled inner edge for receiving the force-transmitting member. The seat, may, for example, comprise a cylindrical cup-shaped member received in a bore of the second part with an outer surface of the seat flush with a surface of the second part. A detent mechanism provided on the first movable part is arranged to hold the bearing surface of the force-transmitting member in contact with the bearing surface of the seat. The detent mechanism is configured to release the force-transmitting member to slide along the channel away from the seat when a force applied by the force-transmitting member on the detent mechanism exceeds a threshold force. The detent mechanism comprises a holding member movable between a disengaged position wherein the force-transmitting member is released and an engaged position wherein the force-transmitting member is held against the seat. The holding member, which may also be called a latching member may comprise, for example, a detent ball (such as a ball bearing). In some embodiments the holding member is provided by a plurality of balls. The detent mechanism also comprises a first pressurized-fluid actuator comprising a chamber configured for receiving a pressurized fluid and configured to bias the holding member toward the engaged position with a force determined by a pressure of pressurized fluid in the chamber.

In some embodiments the detent mechanism comprises a pin slidably disposed in the channel and the holding member engages a feature on the pin. For example, in some embodiments the holding member engages a surface of a flange on the pin. In some embodiment the flange provides an inclined side surface on its side facing away from the force-transmitting member and the holding member bears against the inclined side surface of the flange.

In some embodiments the chamber comprises an annular chamber extending around the pin and the pressurized-fluid actuator comprises an annular piston having an annular face bearing against the detent ball. The annular face of the piston is sloped inwardly so as to urge the detent ball toward the pin with a force dependent on a pressure of pressurized fluid in the chamber. It is not mandatory that the piston be made of a single piece. In some embodiments a pressurized fluid actuator may be coupled to move the annular face by an intermediate linkage In some embodiments a second pressurized-fluid actuator is arranged to force the pin in a direction toward the seat. In some embodiments the first movable part is coupled to the second movable part for rotation relative to the second movable part about an axis of rotation and the seat is spaced apart from the axis of rotation. The channel may be parallel to the axis of rotation but may alternatively be at an angle to the axis of rotation. For example, the channel may be oriented at a right angle to the axis of rotation.

Another non-limiting aspect provides a force-limiting coupling comprising a force-transmitting member slidably disposed in a channel on a first movable part. The force-transmitting member is movable between a first position in which the force-transmitting member is retracted into the channel and a second position wherein the force transmitting member projects from the channel across an interface to engage a seat on a second movable part. The seat and force-transmitting member are shaped such that the force-transmitting member can project more deeply into the seat when the channel is aligned with the seat than when the channel is displaced transversely relative to the seat. A detent mechanism comprises a latching member arranged to hold the force-transmitting member in contact with the seat when the channel is aligned with the seat. The latching member may comprise a ball or a number of balls, for example. The latching member arranged to be moved from an engaged position toward a disengaged position against a force of a pressurized fluid in response to a force applied on the detent mechanism by the force-transmitting member in a direction away from the seat.

In some embodiments the detent mechanism is configured to release the force-transmitting member to slide freely along the channel away from the seat when the latch member is in the disengaged position.

Another non-limiting example aspect provides a method for limiting a force transmitted between a first part and a second part. The first and second parts may be rotatable relative to one another or linearly movable for example. The method comprises engaging a surface of force-transmitting member carried by the first part in a seat on the second part and applying a transmitted force in a direction parallel to an interface between the first and second parts by way of the force-transmitting member. The method allows the transmitted force to urge the force-transmitting member to move relative to the seat and to thereby generate a reaction force that tends to move the force-transmitting member in a direction away from the seat. The method resists the reaction force with a latching member while allowing the reaction force to apply an unlatching force directed to urge the latching member from an engaged position toward a disengaged position against a force applied using a pressurized fluid.

Further aspects and example embodiments are illustrated in the accompanying drawings and/or described in the following description.

BRIEF DESCRIPTION OF THE DRAWINGS

The accompanying drawings illustrate non-limiting example embodiments of the invention.

DESCRIPTION

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the system to the precise forms of any example embodiment. Accordingly, the description and drawings are to be regarded in an illustrative, rather than a restrictive, sense.

This disclosure describes mechanisms that may be used to provide over-torque protection in rotating machines. As described below, the basic mechanism may also be used in other contexts—for example to provide disengagement of parts that move linearly when a force required to drive the parts exceeds a threshold.

Figure 1:
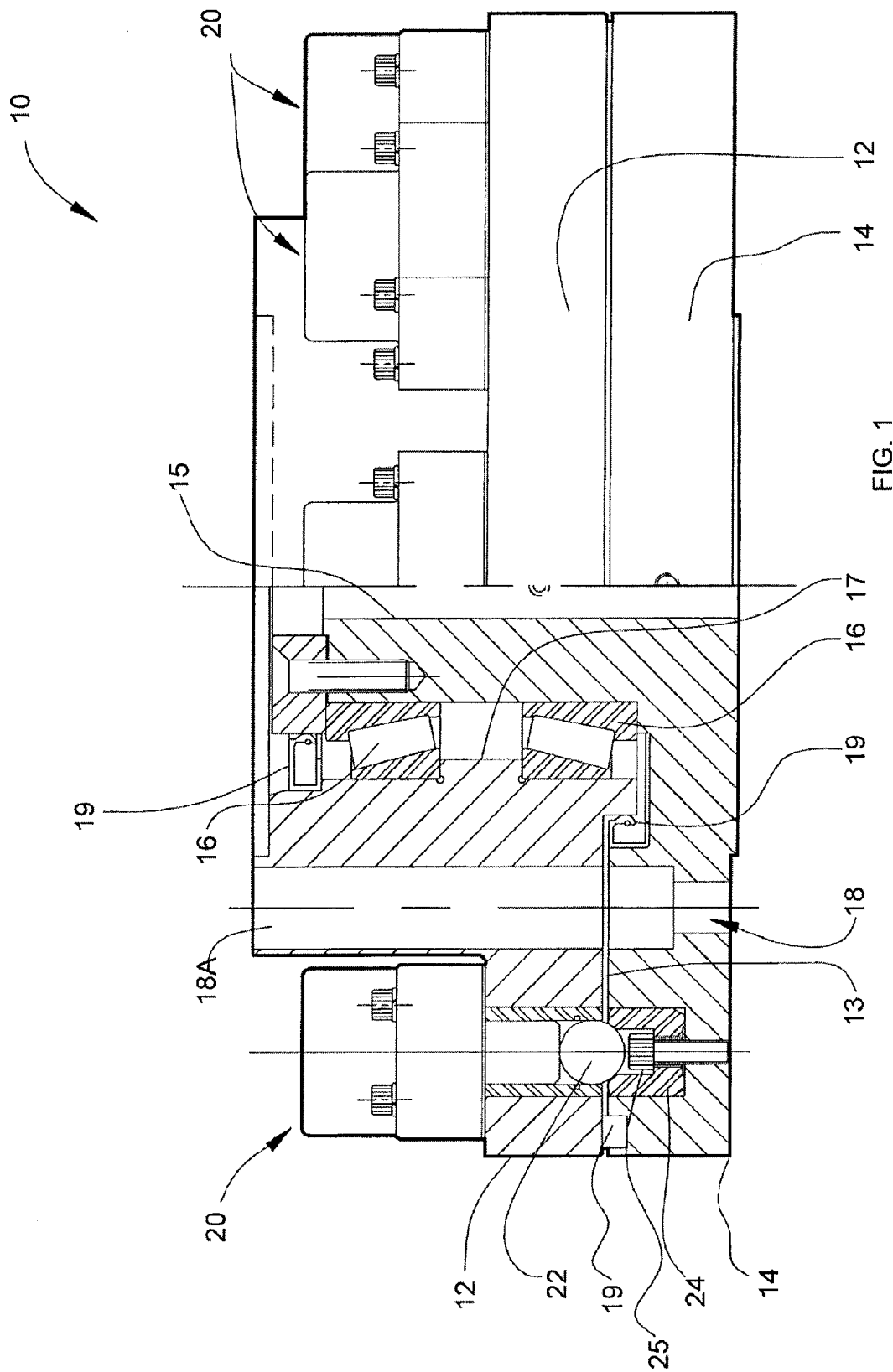
FIG. 1 is a partial elevational section through a torque coupling according to an example embodiment.

FIG. 1 illustrates an example over-torque protection coupling 10 according to one embodiment. Coupling 10 transmits torque between rotating parts 12 and 14. The particular mechanism by which parts 12 and 14 are supported for rotation relative to one another may be varied. One of rotating parts 12 and 14 is coupled directly or indirectly to a driving part and the other one of parts 12 and 14 is coupled directly or indirectly to a driven part. One or both of these couplings may be provided by one or more drive shafts, for example. The particular manner in which parts 12 and 14 are coupled to driving and driven components may be varied.

In the illustrated embodiment, part 14 includes a stub-shaft 15 which is supported by bearings 16 in a bore 17 provided in rotating part 12. One or more coupling mechanisms 20 (which may also be called safety releases or safety mechanisms) effect a mechanical coupling across an interface 13 between parts 12 and 14. The mechanical coupling transmits torque between parts 12 and 14 so that part 12 can drive part 14 or vice versa.

Under normal operation the mechanical coupling locks parts 12 and 14 together so that they do not rotate relative to one another. However, when an over-torque condition occurs, the mechanical coupling(s) provided by mechanism(s) 20 release automatically, thereby permitting part 12 to rotate freely in relation to part 14 (and ceasing the delivery of torque between parts 12 and 14).

In the illustrated embodiment, holes 18 which may be accessed through bores 18A are provided to couple part 14 to a driving or driven part. Threaded holes 18B (not shown in FIG. 1—see FIG. 4) in part 12 that are offset relative to bores 18A may be provided to couple part 12 to a driven or driving part. The illustrated embodiment includes seals 19 to prevent dirt, fluids, and the like, from entering interface 13 and bore 17.

Figure 2:
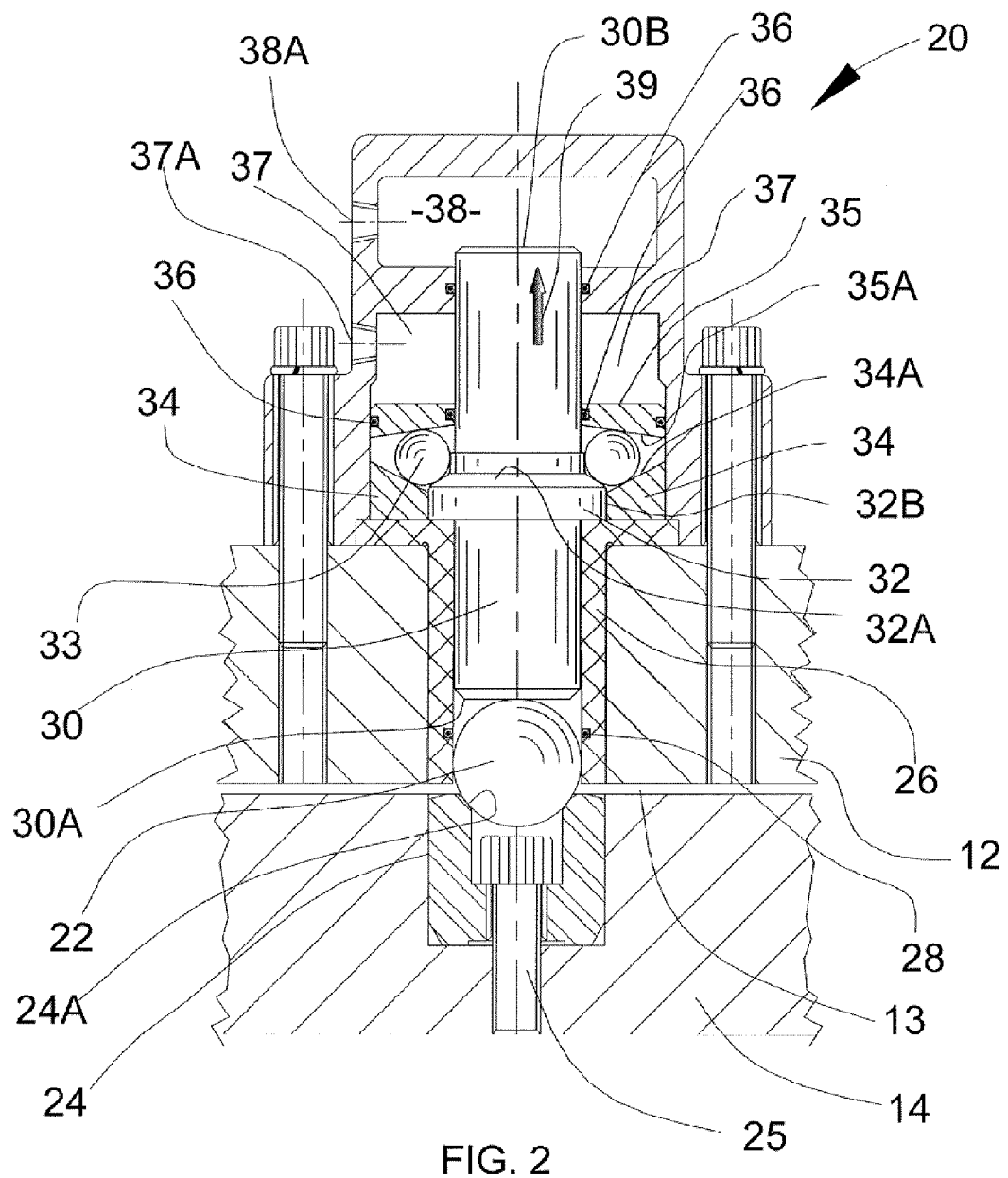
FIG. 2 is an elevational cross section of a torque-release mechanism in an engaged configuration.

An example coupling mechanism 20 is illustrated in FIG. 2. Coupling mechanism 20 comprises a ball 22 which extends across interface 13. Ball 22 engages a seat 24 in part 14. Ball 22 is also dimensioned to fit within a bore 26 in part 12. The fit of ball 22 in bore 26 is such that ball 22 can slide longitudinally along bore 26. In some embodiments, end 30A of pins 30 have a dimple or recess to receive the ball 22 and to help to keep ball 22 centred within bore 26. As long as ball 22 remains in the configuration illustrated in FIG. 2, ball 22 can transmit torque across interface 13.

Ball 22 is held in the position illustrated in FIG. 2 by a pin 30 having an end 30A that engages the top of ball 22. Pin 30 and ball 22 are both slidably disposed in bore 26. However, pin 30 is prevented from moving away from seat 24 (i.e. in direction 39) by a detent mechanism.

In the illustrated embodiment, the detent mechanism comprises a number of balls 33 that engage a feature of pin 30. Pin 30 comprises a flange 32 having a sloping face 32A. Balls 33 block face 32A of flange 32 from moving in direction 39 and thereby prevent motion of pin 30 in direction 39.

The detent mechanism is designed to release and to thereby permit pin 30 to move in direction 39 when the force exerted on pin 30 by ball 22 exceeds a threshold force. In the illustrated embodiment, the force required to release the detent mechanism is hydraulically controlled. Balls 33 are engaged between a seat 34 having a sloped face 34A and an annular piston 35 having a sloped face 35A. Piston 35 and seat 34 retain balls 33 and may be called 'retaining rings'.

Annular piston 35 is compressed toward seat 34 by a pressurized fluid in chamber 37. The pressurized fluid may be introduced through a port 37A. The pressure of the fluid in chamber 37 may be set to a desired pressure by a regulator or other suitable pressure control mechanism (not shown in FIG. 2). Seals 36 prevent leakage of the pressurized fluid past annular piston 35.

Because faces 34A and/or 35A are sloped, the result of compressing piston 35 toward seat 34 is a radially inwardly directed force on each of balls 33. This force keeps balls 33 compressed against pin 30 blocking flange 32 from moving in direction 39.

Seat 24 receives ball 22 in a pocket comprising sloping faces 24A. When ball 22 is transmitting torque between parts 12 and 14, ball 22 tends to ride up sloping face 24A. This results in a component of force on ball 22 directed in direction 39. This component force is transmitted from ball 22 to piston 30. This, in turn, results in sloping face 32A pushing on balls 33 in direction 39. Because face 32A is sloping, as the force on pin 30 in direction 39 increases, a force component tends to push balls 33 radially outwardly from pin 30. This outward force component on balls 33 counteracts the inward force applied to balls 33 by the compression of piston 35 toward seat 34.

When the outward forces on balls 33 exceed the inward forces (as determined by the pressure of fluid in chamber 37), balls 33 move radially outwardly. When balls 33 have moved far enough outwardly they no longer prevent flange 32 from moving in direction 39. At this point, piston 30 no longer holds ball 22 in engagement with recess 24 and ball 22 can move along bore 26 in direction 39 to the configuration shown in FIG. 3. When ball 22 is engaged in seat 24, the release torque can be varied by varying the pressure in chamber 37. This may be done while the unit is running.

Figure 3:
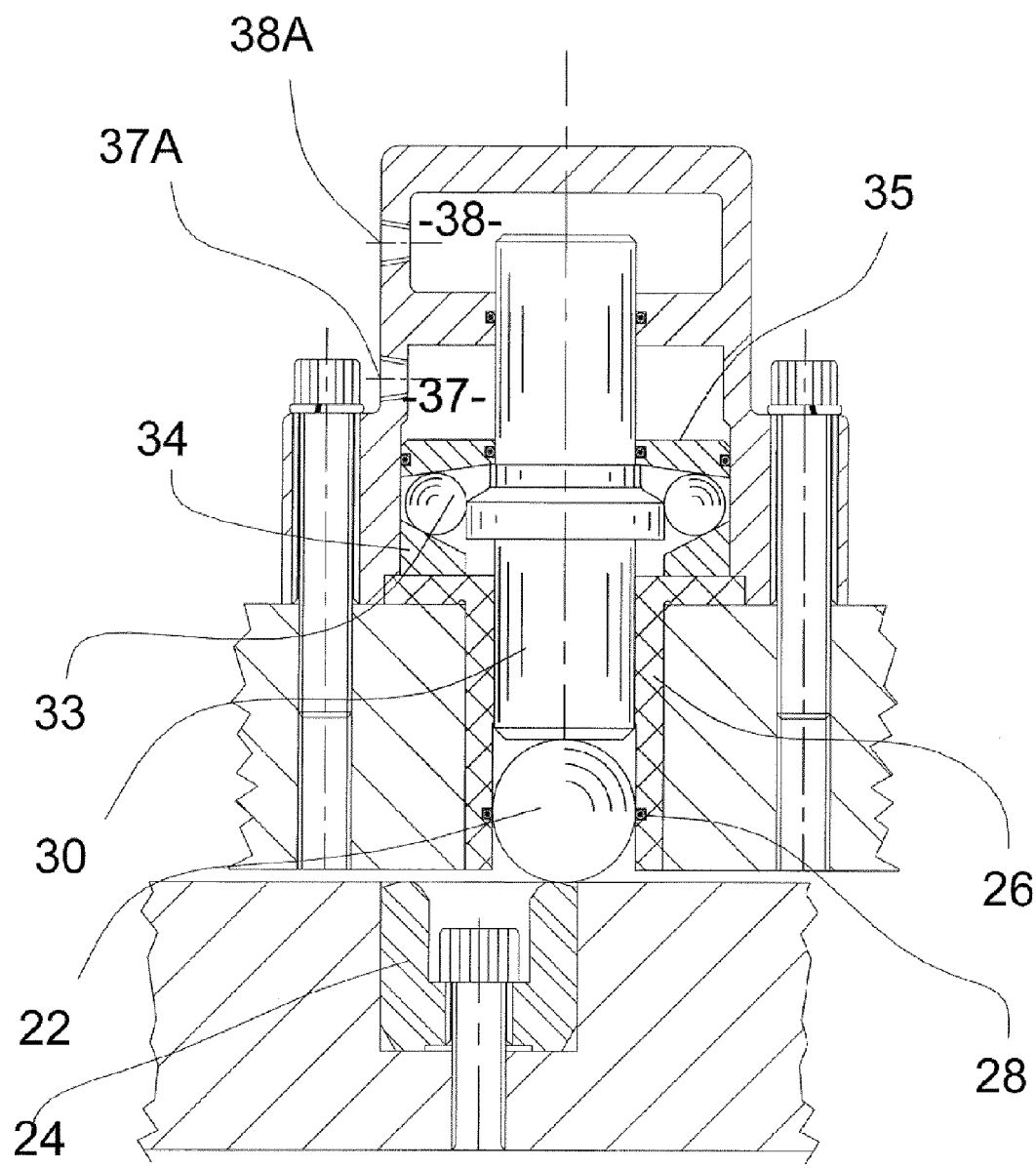
FIG. 3 is an elevational cross section of the torque release mechanism of FIG. 2 in a disengaged configuration.

In the configuration shown in FIG. 3, balls 33 are against the outer face 32B of flange 32 and ball 22 is received far enough inside bore 26 that part 14 can rotate relatively freely with respect to part 12. In the illustrated embodiment, a holding mechanism 28 (which may, for example, comprise an O ring) releasably holds ball 22 recessed within bore 26, out of engagement with receptacle 24.

The pressurized fluid introduced into chamber 37 may be any suitable fluid. For example, the fluid may comprise pressurized gas, such as pressurized air, or pressurized nitrogen. In the alternative, the fluid may comprise a pressurized liquid, such as hydraulic fluid, oil, water, or the like. Where the pressurized fluid comprises an incompressible fluid, such as a liquid, it is desirable to provide an accumulator or a dynamically-set pressure such that the pressure in chamber 37 remains relatively constant as the forces acting on balls 33 act to displace piston 35 toward chamber 37.

After mechanism 20 has been released to the configuration shown in FIG. 3, an operator of the machine can correct the situation which lead to the over-torque condition and then may wish to reset mechanism 20. In the illustrated embodiment, resetting mechanism 20 may be done by introducing a pressurized fluid into chamber 38. This may be done, for example, through a port 38A. End 30B of pin 30 projects into chamber 38 through seals 36. The introduction of pressurized fluid into chamber 38 tends to force pin 30 in the direction opposite to direction 39. If this is done while part 14 is rotated slowly relative to part 12 then, when balls 22 are aligned with their respective seats 24, pins 30 will push balls 22 downwardly into engagement with seats 24. If, at the same time, pressurized fluid is provided in chamber 37 then, as soon as end 30 has moved to the configuration shown in FIG. 2, the pressurized fluid in chamber 37 will compress piston 35 toward seat 34, thereby pushing balls 33 back into engagement with flange 32 and holding them in such engagement.

Resetting may be performed while the unit is running. The rotation speed of the coupling may be reduced sufficiently (if necessary) to allow the balls 33 to be easily re-set. After ball 22 has seated in its seat 24 the pressure in chamber 38 can be lowered and normal operations can resume.

Figure 4:
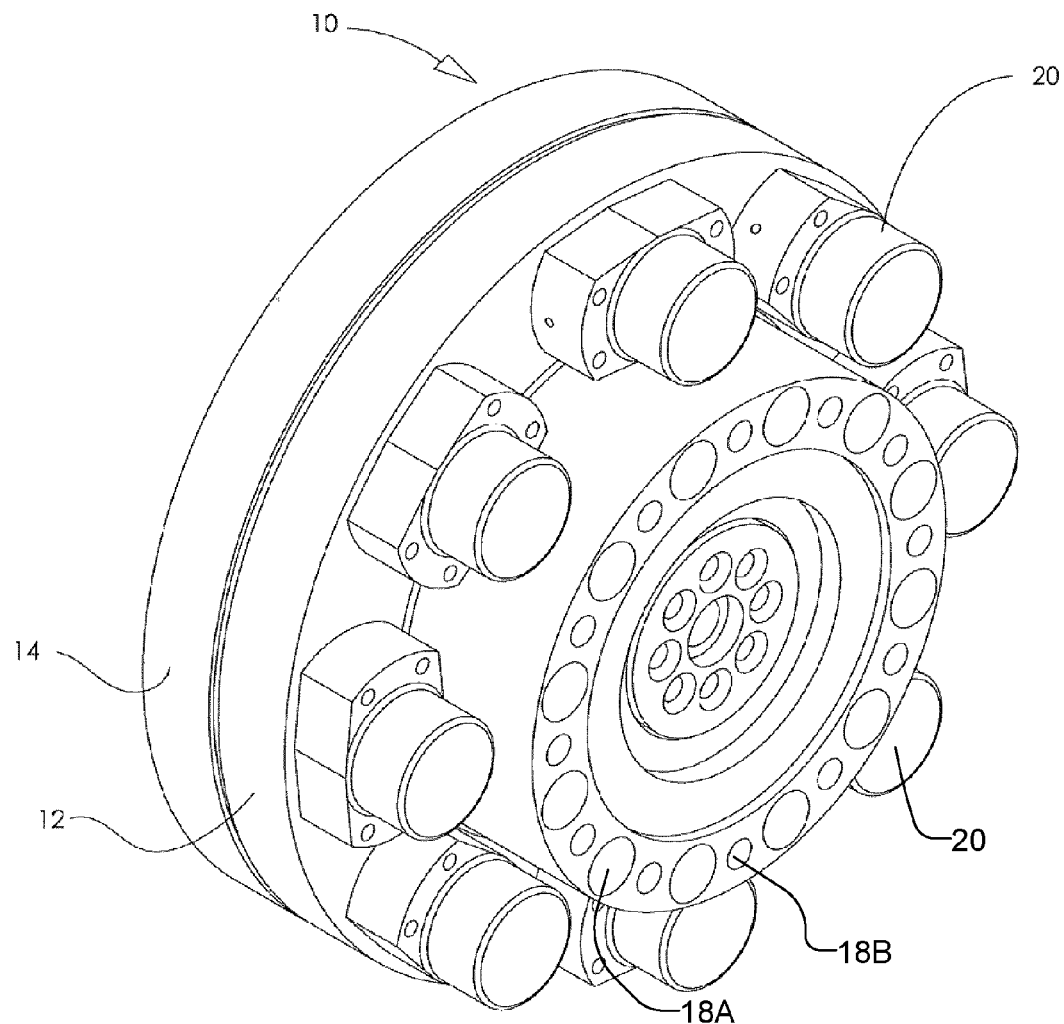
FIG. 4 is an isometric view of a torque release coupling having axially-oriented torque release mechanisms.

FIG. 4 shows an example coupling 10. The magnitude of torque which coupling 10 can transmit may be determined by the mechanical construction of mechanisms 20, as well as the number of mechanisms 20 provided and the radial distances between mechanisms 20 and the centre of rotation of coupling 10.

Figure 5:
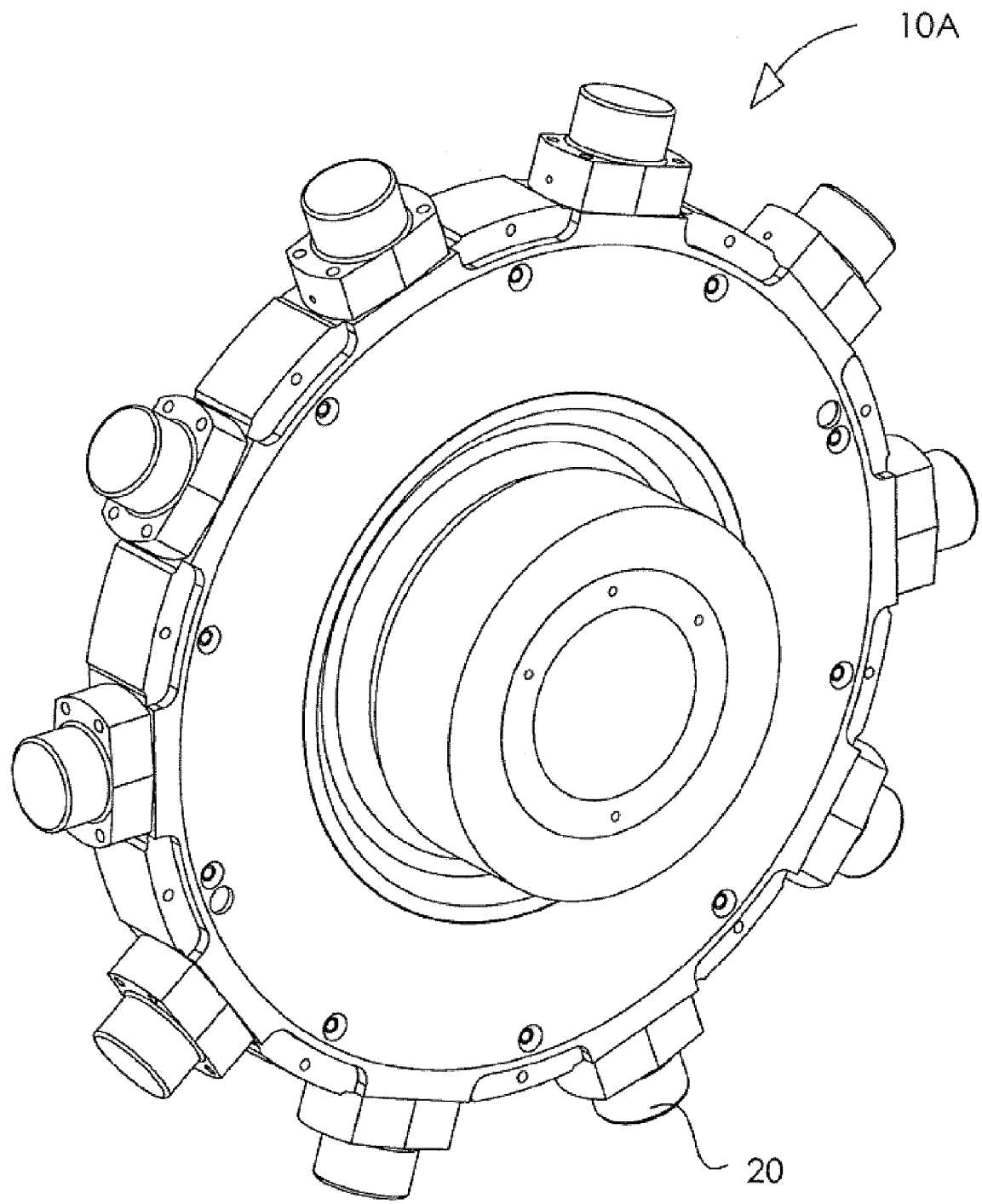
FIG. 5 is an isometric view of a torque release coupling having radially-oriented torque-release mechanisms.
Figure 6:
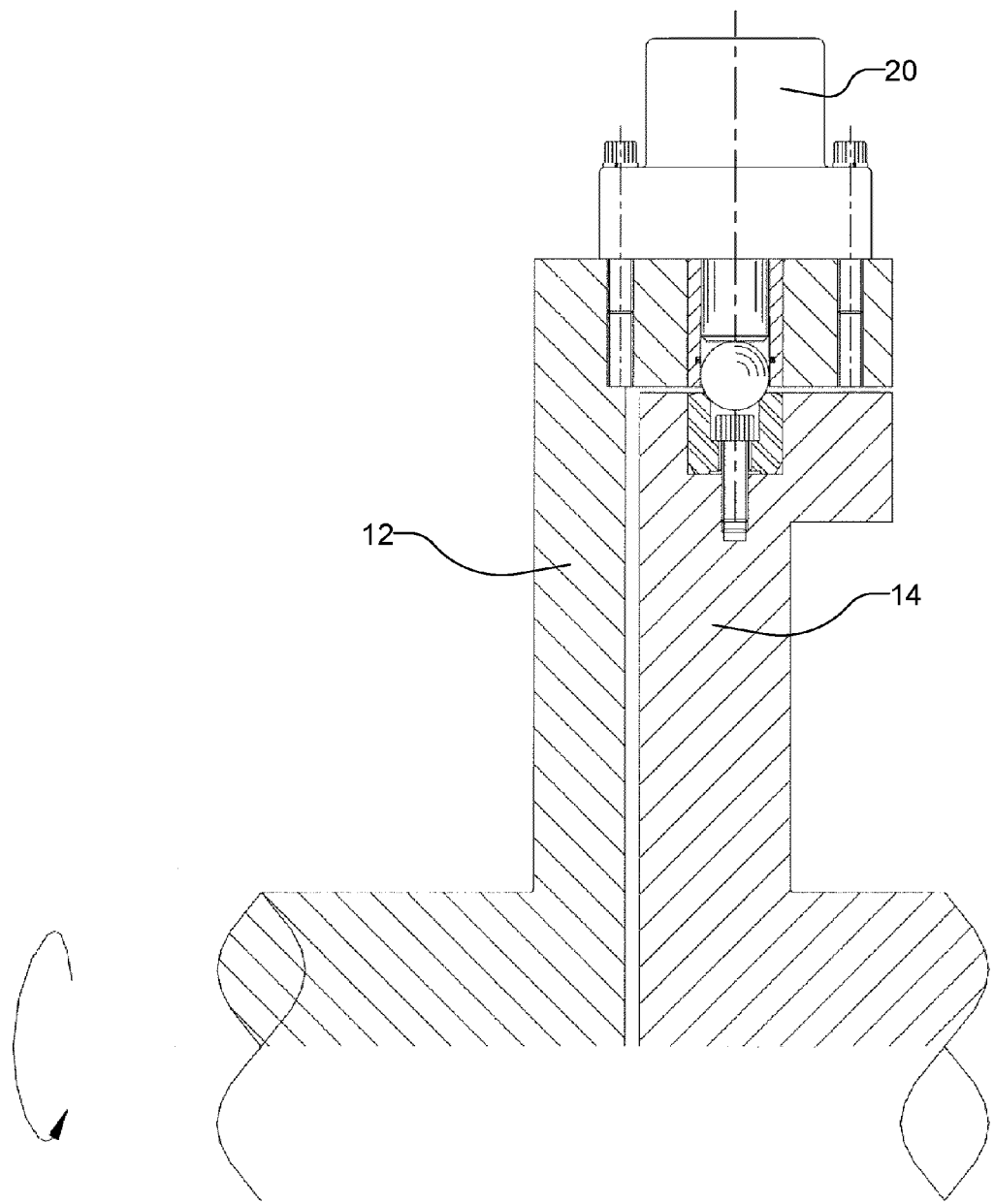
FIG. 6 is a schematic partial cross section though the torque-release coupling like that of FIG. 5.

FIGS. 5 and 6 show a torque release coupling 10A according to an alternative embodiment which may function in essentially the same way as the embodiments described above. In the embodiment of FIG. 5, mechanisms 20 are arranged to project radially relative to an axis of rotation of coupling 10A. Alternative configurations in which one or more mechanisms 20 are oriented at other angles to an axis of rotation of a coupling may also be provided.

From the discussion above, it can be appreciated that one or more mechanisms 20 may also be used to couple linearly-directed force from one member to another and may release automatically when the force applied between the two members exceeds a threshold.

Figure 7:
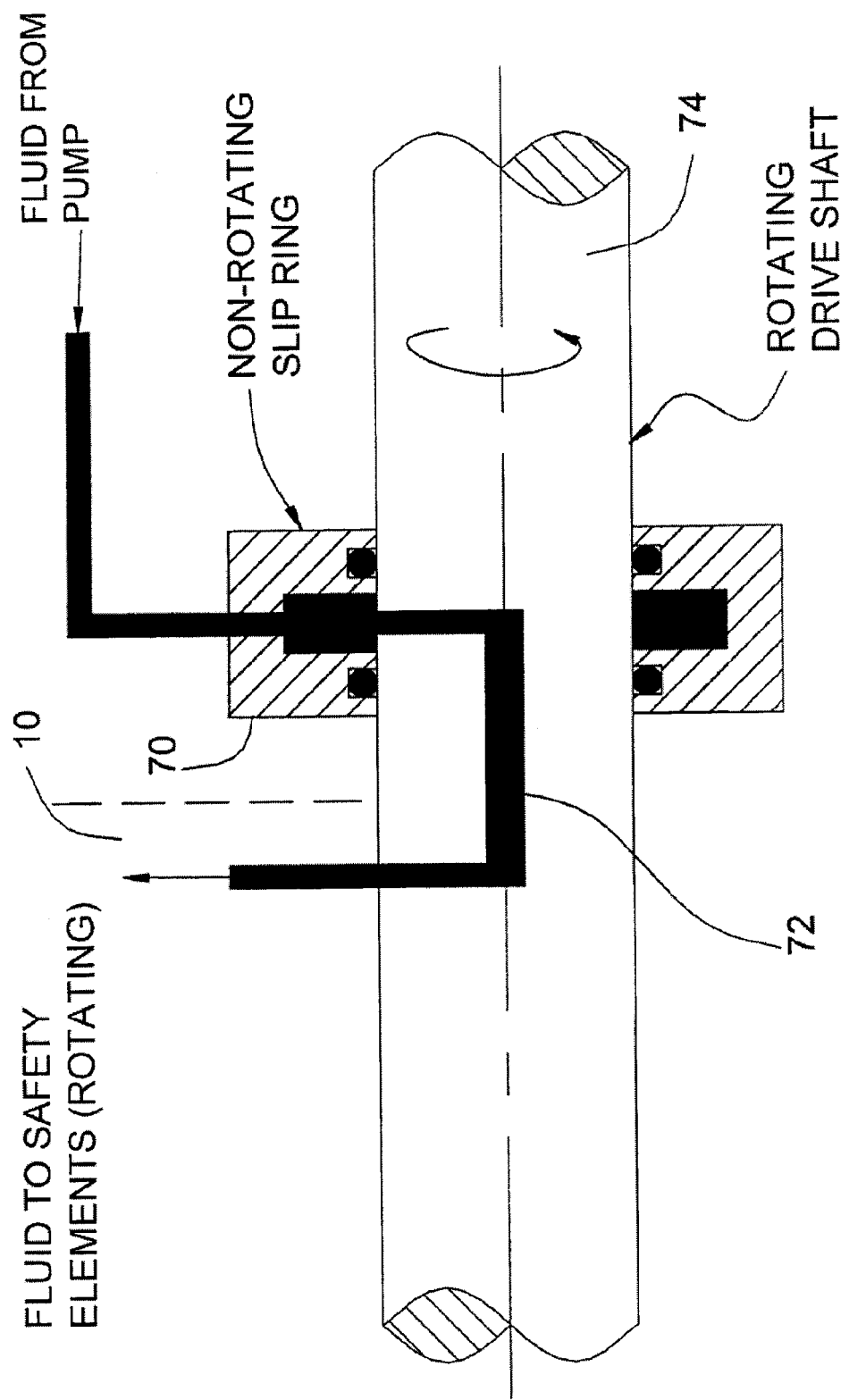
FIG. 7 is a schematic diagram illustrating a system for delivering pressurized fluid to a rotating coupling for operating a torque-release mechanism.

In the case where mechanisms 20 are used in a rotating coupling, for example the rotating couplings as described above, there is a need for a way to provide pressurized fluid to chambers 37 and/or 38. In some embodiments, pressurized fluid is supplied to these chambers through rotating couplings (e.g. hydraulic slip rings). FIG. 7 shows an example embodiment in which pressurized fluid is supplied through a hydraulic slip ring 70 into a fluid passage 72 in a shaft 74 coupled to a torque-release coupling 10. In some embodiments another hydraulic slip ring is provided for the return of hydraulic fluid to a fluid source. One or more slip rings 70 may be integrated with a rotating coupling.

Figure 8:
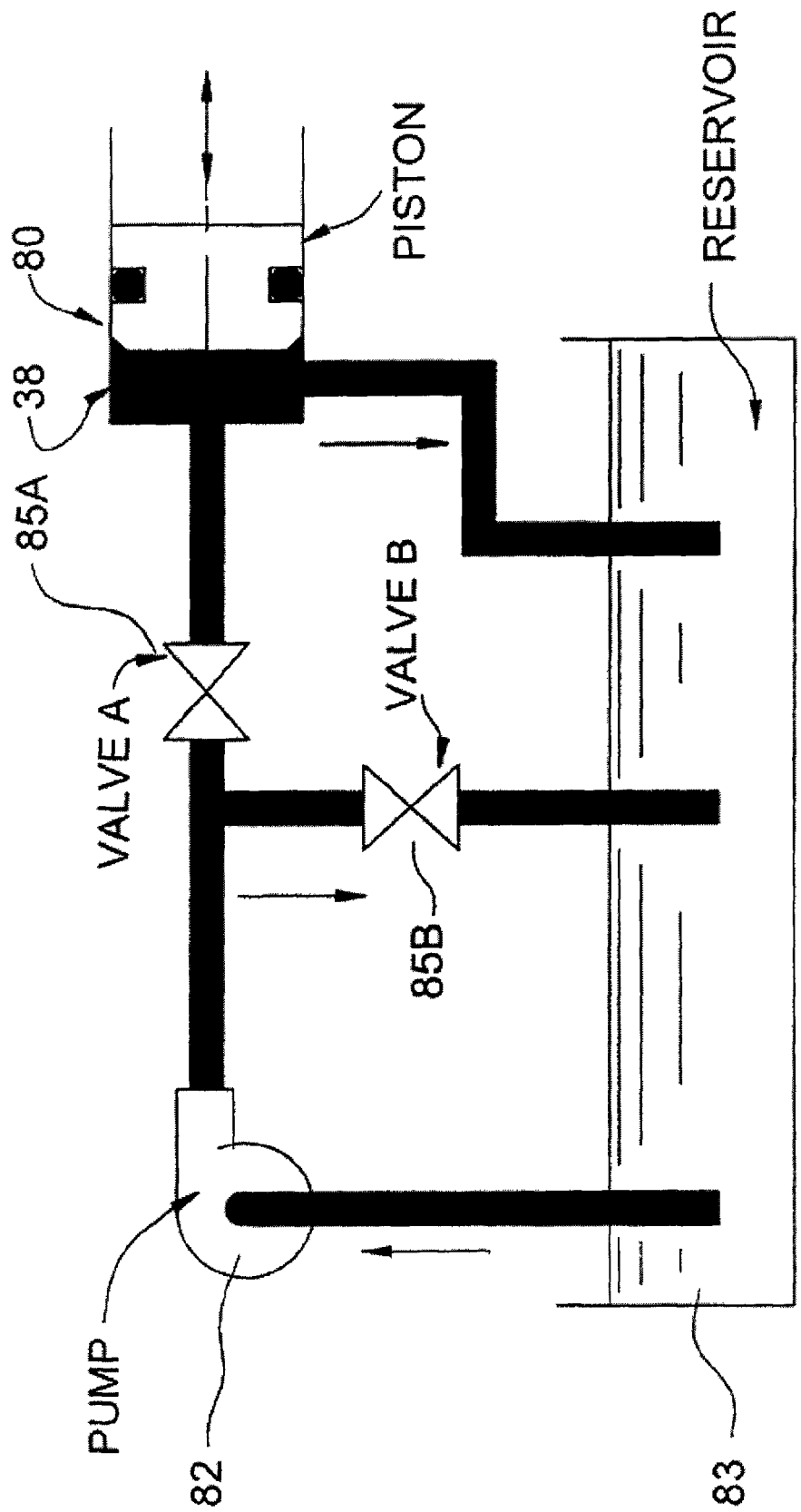
FIG. 8 is a schematic diagram of an example hydraulic system for supplying pressurized fluid.

FIG. 8 shows a non-limiting example hydraulic circuit 80 that may be used to provide pressurized fluid to chamber 37 and/or 38 as required. A pump 82 delivers hydraulic fluid from a reservoir 83, the delivery pressure being variable in any suitable manner (for example, those of skill in the art are aware of many ways to provide a supply of hydraulic fluid at a desired pressure). The fluid leaving pump 82 is directed toward either adjustable valve 85A or adjustable valve 85B, and the proportion of flow through each of valves 85A and 85B may be regulated by the valve settings. The fluid pressure leaving valve 85A can be set to a desired value by suitably adjusting the pump delivery pressure and the setting of valve 85A.

The fluid leaving valve 85A is directed into chamber 38. A similar circuit (not shown) can be arranged to deliver a hydraulic fluid at a desired pressure to chamber 37. In alternative embodiments a source of compressed gas is provided. The compressed gas may be delivered to pressurize chambers 37 and/or 38 as desired by way of a distribution system comprising a suitable arrangement of valves.

The descriptions of the hydraulic circuits above are meant only to illustrate one method of operation, and those familiar with the art of hydraulic circuit design will understand that many details have been omitted, such as filters, accumulators, and other items. It is also appreciated that there can be common elements to the circuits, for example a single pump, dual control valves and single filters reservoirs, and so on.

The ability to both set the release torque while running, and re-set the elements after release, while running, are significant benefits provided by the example embodiments described above.

The ability to control a threshold torque may be applied in a wide variety of ways. In some embodiments the pressure of pressurized fluids applied to chamber 37 may be manually adjusted. For example, a control may be provided that allows an operator to adjust a setting of a regulator which regulates a pressure of hydraulic fluid supplied to chamber 37 and/or a control that regulates the operation of a pumping system which generates pressurized fluid so that the pressurized fluid has a desired pressure. Similarly, a manual control may be provided to supply pressurized fluid to chamber 38 for resetting mechanisms 20.

In other embodiments, control of the pressure of the supplied fluid may be automated. In such embodiments, an electronic controller may control whether or not pressurized fluid is supplied to chamber 38 and also may control the pressure of pressurized fluids supplied to chamber 37. In such embodiments, the controller may control various operational sequences that may be advantageous in certain circumstances. For example, the controller may automatically set the pressure of pressurized fluid in chamber 37 to a relatively low level for starting a machine. This may be desirable, for example, where the machine is initially started under conditions when it is not under load. After it has been verified that the machine is operating correctly, the pressure in chamber 37 may be automatically ramped up to the level suitable for placing the machine under load.

As another example, pressure in chamber 37 may be automatically varied in response to the rotational speed of a torque-release coupling. Such variation may be used to compensate for centrifugal forces acting on pins 30 and also may, for example, be applied to maintain a desired relationship between available torque and rotational speed. For example, the torque may automatically be set at various speeds so that a power transmitted through the coupling is constant over a range of different rotational speeds or, in the alternative, varies according to a desired relationship between maximum power transmitted and rotational speed. Other embodiments are also possible.

Couplings of the sort described herein have particular application in cases where large torques or forces must be transmitted between moving members. In some embodiments, a coupling as shown, for example, in FIG. 4 or FIG. 5, is designed to transmit torques in excess of 20,000 foot pounds or in excess of 30,000 foot pounds. Such a coupling may, for example, serve to protect machinery such as tunnel boring machines, rock crushers, grinding machines, or other heavy duty machines.

In an example use case, a coupling as described herein as provided to transmit power from a motor to the head of a mining machine. The coupling may be located in a part of the machine that is relatively difficult to access. The coupling may automatically release when an over-torque condition is developed during operation of the machine. If this occurs, an operator may cause the coupling to be reset from a remote location by either manually or automatically adjusting the supply and pressure of pressurized fluid to chambers 37 and 38 such that chambers 38 are pressurized sufficiently to force pins 30 and balls 22 toward seats 24 and so that there is sufficient pressure in chambers 37 to cause balls 33 to move radially inward to hold pins 30 in place after balls 22 have become engaged with seats 24. Thus, normal operation of the machine may be restored much more quickly and easily than would be the case if, for example, shear pins needed to be replaced.

Furthermore, since coupling 10 can release completely when an over-torque condition occurs, mechanical damage may be limited in the case where the over-torque condition results from a breakage or malfunction of the machine or a jamming of the machine by material being processed.

A number of variations in the construction of mechanisms 20 are possible. For example, ball 22 could be attached to pin 30. In other embodiments, instead of a separate ball 32 an end of pin 30 may be shaped to interface with seats 24. The number of balls 33 may be varied. It is convenient to provide as many balls 33 as will fit around the circumference of rod 30 for best wear resistance. However, fewer balls 33 could be used in some embodiments. A spring could be provided in chamber 37 to augment the force supplied by pressurized fluid in chamber 37. Balls 33 could be replaced with wedge members that slide radially inwardly and outwardly between annular piston 35 and seat 34. Seats 24 may have the form of circular cups, which is preferred, but could also have other forms. For example, seats 24 could comprise radial grooves in rotating part 14.

INTERPRETATION OF TERMS

Unless the context clearly requires otherwise, throughout the description and the claims:
"comprise", "comprising", and the like are to be construed in an inclusive sense, as opposed to an exclusive or exhaustive sense; that is to say, in the sense of "including, but not limited to";
"connected", "coupled", or any variant thereof, means any connection or coupling, either direct or indirect, between two or more elements; the coupling or connection between the elements can be physical, logical, or a combination thereof;
"herein", "above", "below", and words of similar import, when used to describe this specification, shall refer to this specification as a whole, and not to any particular portions of this specification;
"or", in reference to a list of two or more items, covers all of the following interpretations of the word: any of the items in the list, all of the items in the list, and any combination of the items in the list;
the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a component (e.g. a piston, bearing, assembly, pin, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A force-limiting coupling comprising:
   a force-transmitting member comprising a pin slidably disposed in a channel on a first movable part;
   a second movable part comprising a seat for receiving a bearing surface of the force-transmitting member, the seat comprising a bearing surface inclined in a force-transmission direction;
   a detent mechanism on the first movable part, the detent mechanism arranged to hold the bearing surface of the force-transmitting member in contact with the bearing surface of the seat, the detent mechanism configured to release the force-transmitting member to slide along the channel away from the seat when a force applied by the force-transmitting member on the detent mechanism exceeds a threshold force, the detent mechanism comprising:
   a holding member movable between a disengaged position wherein the force-transmitting member is released and an engaged position wherein the force-transmitting member is held against the seat;
   a first pressurized-fluid actuator comprising a first chamber configured for receiving a pressurized fluid and configured to bias the holding member toward the engaged position with a force determined by a pressure of pressurized fluid in the first chamber; and
   a second pressurized-fluid actuator arranged to electively force the pin in a direction toward the seat, thereby moving the force-transmitting member from the disengaged position to the engaged position.

2. A force-limiting coupling according to claim 1 wherein the force-transmitting member comprises a ball.

3. A force-limiting coupling according to claim 1 wherein the pin comprises a flange having an inclined side surface on its side facing away from the force-transmitting member and the holding member bears against the inclined side surface of the flange.

4. A force-limiting coupling according to claim 3 wherein the holding member comprises a detent ball.

5. A force-limiting coupling according to claim 4 wherein the chamber comprises an annular chamber extending around the pin, the pressurized-fluid actuator comprises an annular piston having an annular face bearing against the detent ball, the annular face of the piston sloped inwardly so as to urge the detent ball toward the pin with a force dependent on a pressure of pressurized fluid in the chamber.

6. A force-limiting coupling according to claim 5 comprising an annular seat extending around the pin on a side of the detent ball opposed to the annular piston.

7. A force-limiting coupling according to claim 6 wherein the annular seat comprises an annular face bearing against the detent ball, the annular face of the annular seat sloped inwardly toward the pin.

8. A force-limiting coupling according to claim 7 wherein the channel comprises a round bore.

9. A force-limiting coupling according to claim 1 wherein an end of the pin forms part of a wall of a chamber of the second pressurized-fluid actuator.

10. A force-limiting coupling according to claim 1 comprising a pressure adjustment mechanism connected to adjust a pressure of pressurized fluid in the chamber of the first pressurized-fluid actuator.

11. A force-limiting coupling according to claim 1 wherein the first movable part is coupled to the second movable part for rotation relative to the second movable part about an axis of rotation and the seat is spaced apart from the axis of rotation.

12. A force-limiting coupling according to claim 11 wherein the channel is non-parallel to the axis of rotation.

13. A force-limiting coupling according to claim 11 wherein the channel is oriented at a right angle to the axis of rotation.

14. A force-limiting coupling according to claim 11 wherein the channel is oriented parallel to the axis of rotation.

15. A force-limiting coupling according to claim 11 comprising a rotating fluid coupling in fluid communication with the first chamber of the first pressurized-fluid actuator.

16. A force-limiting coupling comprising:
a force-transmitting member slidably disposed in a channel on a first movable part, the force-transmitting member movable between a first position in which the force-transmitting member is retracted into the channel and a second position wherein the force transmitting member projects from the channel across an interface to engage a seat on a second movable part, the seat and force-transmitting member shaped such that the force-transmitting member can project more deeply into the seat when the channel is aligned with the seat than when the channel is displaced transversely relative to the seat;
a detent mechanism comprising a latching member arranged to hold the force-transmitting member in contact with the seat when the channel is aligned with the seat, the latching member arranged to be moved from an engaged position toward a disengaged position against a force of a pressurized fluid in response to a force applied on the detent mechanism by the force-transmitting member in a direction away from the seat, wherein, in the engaged position the latching member holds the force-transmitting member in contact with the seat and in the disengaged position the latching member permits free motion of the force-transmitting member away from the seat; and
a pressurized-fluid actuator operable to electively force the force-transmitting member in a direction toward the seat, thereby urging the force-transmitting member from the disengaged position to the engaged position.

17. A force-limiting coupling according to claim 16 wherein the detent mechanism is configured to release the force-transmitting member to slide freely along the channel away from the seat when the latch member is in the disengaged position.

18. A force-limiting coupling according to claim 17 wherein the latching member comprises a detent ball.

19. A force-limiting coupling according to claim 18 wherein the force-transmitting member comprises a ball.

20. A force-limiting coupling according to claim 19 wherein the detent mechanism comprises a pin slidably disposed in the channel and, in the engaged position the detent ball bears against an outwardly sloping surface on the pin.

21. A force-limiting coupling according to claim 20 wherein the pin comprises a cylindrical surface adjacent the outwardly-sloping surface and when the detent ball is in the disengaged position the pin is free to slide along the channel until the detent ball bears against the cylindrical surface.

22. A force-limiting coupling according to claim 16 wherein the first movable part is coupled to the second movable part for rotation relative to the second movable part about an axis of rotation and the seat is spaced apart from the axis of rotation.

23. A force-limiting coupling according to claim 22 wherein the channel is non-parallel to the axis of rotation.

24. A force-limiting coupling according to claim 22 wherein the channel is oriented at a right angle to the axis of rotation.

25. A force-limiting coupling according to claim 22 wherein the channel is oriented parallel to the axis of rotation.

26. A force-limiting coupling according to claim 22 comprising a rotating fluid coupling in fluid communication with the chamber of the first pressurized-fluid actuator.

27. A method for limiting a force transmitted between a first part and a second part, the method comprising:
engaging a surface of force-transmitting member carried by the first part in a seat on the second part and applying a transmitted force in a direction parallel to an interface between the first and second parts by way of the force-transmitting member;
allowing the transmitted force to urge the force-transmitting member to move relative to the seat and to thereby generate a reaction force that tends to move the force-transmitting member in a direction away from the seat;
resisting the reaction force with a latching member while allowing the reaction force to apply an unlatching force directed to urge the latching member from an engaged position toward a disengaged position against a force applied using a pressurized fluid;
when the reaction force exceeds a threshold force such that the latching member is moved to the disengaged position, allowing the force-transmitting member to move away from the seat; and
subsequently electively forcing the force-transmitting member in a direction toward the seat using a second pressurized fluid.

* * * * *